Patented Feb. 5, 1946

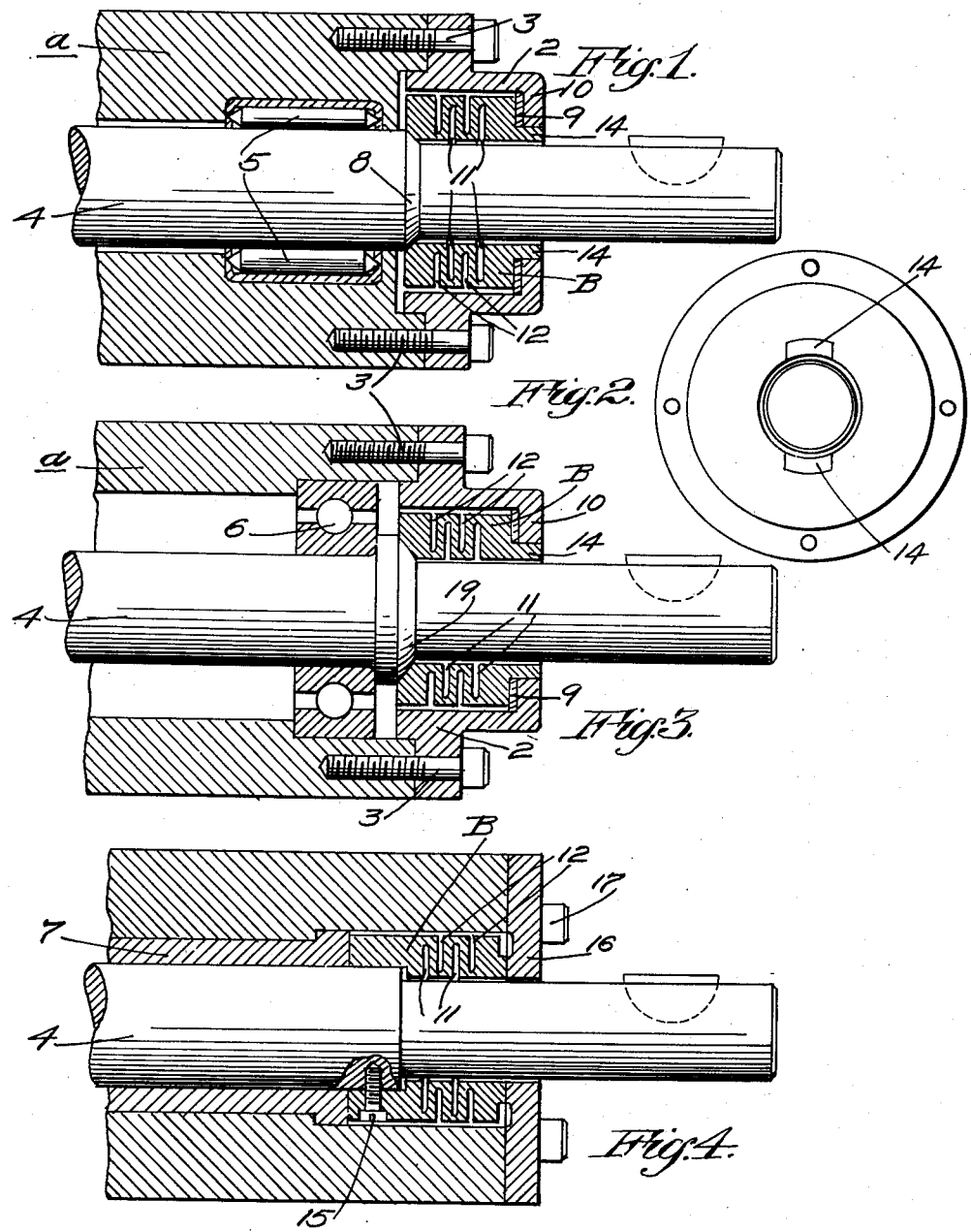

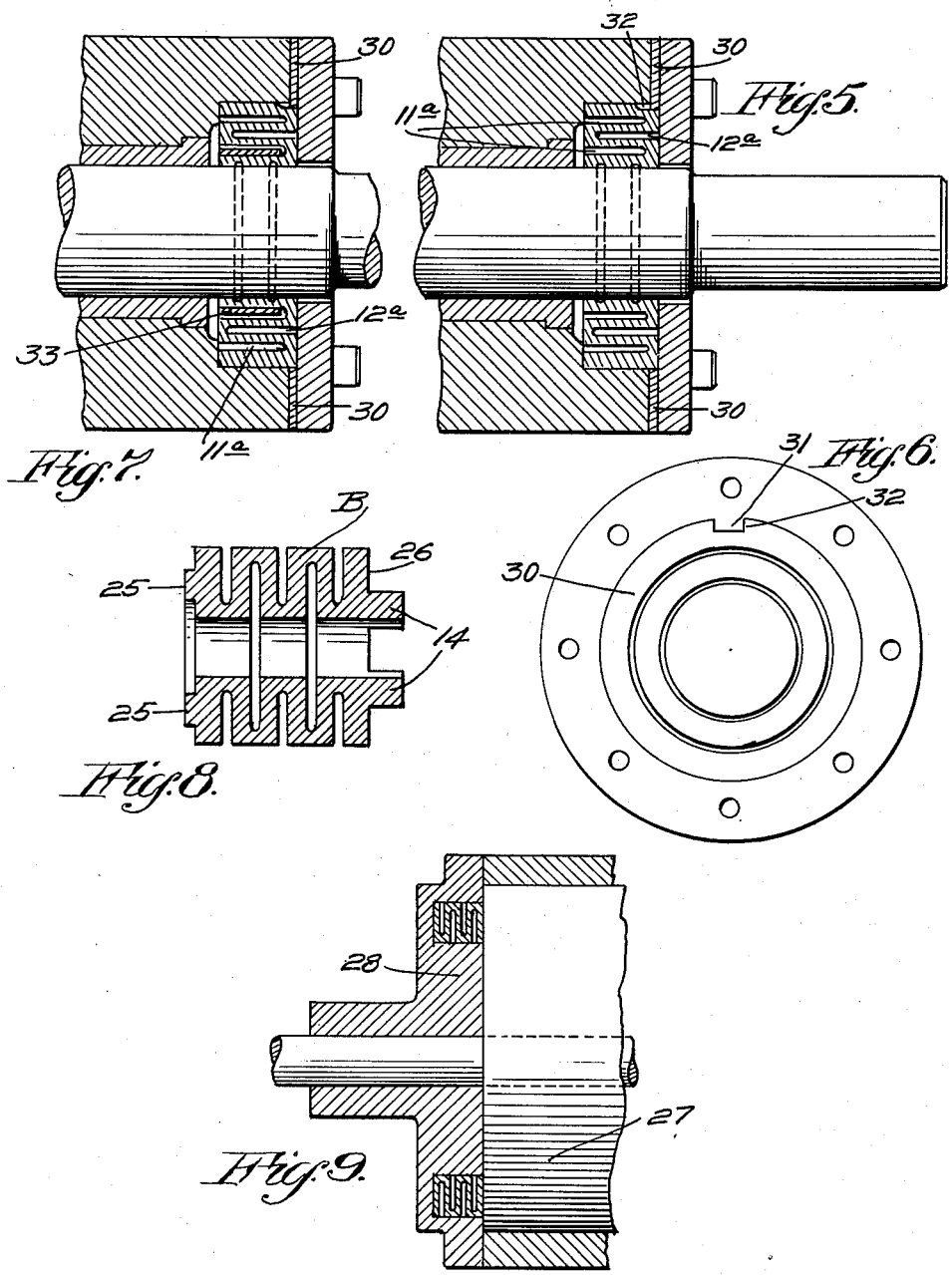

2,394,012

UNITED STATES PATENT OFFICE 2,394,012

SEALING DEVICE

Alden G. Rayburn, Sausalito, Calif.

Application August 25, 1943, Serial No. 500,185

3 Claims. (Cl. 286—11)

This invention relates to a sealing device for all types of fluids, and especially to a sealing device which will form a substantially leak-proof seal between a rotating and a stationary surface or between rotating surfaces or stationary surfaces.

There are numerous sealing devices in use at the present time, which will form a seal between a rotating and a stationary surface, but they are usually complicated in construction. They require several parts in their manufacture and are often difficult to install and service.

The object of the present invention is generally to improve and simplify the construction and operation of sealing devices; to provide a sealing device consisting of a single part and which presents two sealing surfaces, one adapted to contact or engage a rotating member, and the other a stationary member; to provide a sealing member which is resilient so as to compensate for and automatically take up wear, and which may be designed to exert any pre-determined pressure against a surface to be sealed; to provide a sealing device which is simple to manufacture, install and service; to provide a sealing device which may be held stationary or which may rotate while functioning as a sealing device; to provide a sealing device which may also function as a thrust bearing, and further, to provide a sealing device which may be made from any one of several metals, any one of several plastics, from hard or semi-vulcanized rubber, both natural and synthetic, compressed fiber and other materials.

The sealing device is shown by illustration in the accompanying drawings, in which:

Fig. 1 is the central longitudinal section of a bearing housing and a shaft journaled therein, said view also showing the application of the sealing member.

Fig. 2 is an end view of Fig. 1, with bolts removed.

Fig. 3 is a section similar to Fig. 1, showing a spherical contact seat on the shaft, with which the sealing member engages.

Fig. 4 is a section similar to Fig. 1, showing a sealing member which also functions as a thrust bearing.

Fig. 5 is a section similar to Fig. 1, showing a modified form of the sealing member.

Fig. 6 is an end view of Fig. 5, with the end plate removed.

Fig. 7 is a view similar to Fig. 5, showing a modification thereof.

Fig. 8 is a longitudinal central section of a sealing member.

Fig. 9 is a longitudinal section of a pump partly broken away, said section showing the sealing member interposed between the pump rotor and the head of the pump.

Referring to the drawings in detail, and particularly Figs. 1 and 2, $a$ indicates a bearing housing, 2 a cap secured to the outer end thereof by bolts 3, and 4 a shaft extending through the bearing and the cap. The shaft may be supported within the bearing housing by suitable anti-friction roller or ball bearings, as indicated at 5 in Fig. 1, and at 6 in Fig. 3, or the shaft may be supported in a bushing as indicated at 7 in Fig. 4.

The sealing member generally indicated at B, and forming the subject matter of the present invention, is disposed within the cap 2. It surrounds the shaft in the manner of a sleeve, and its opposite ends present sealing surfaces, one of which contacts an angular shoulder 8, formed on the shaft, while the other engages a synthetic rubber ring 9, which in turn is held by an annular flange 10 formed on the cap.

A plurality of staggered annular grooves are formed both internally and externally of the sleeve-like member, as indicated at 11 and 12. The bottom of the grooves are made on a radius to prevent undue strains and possible breakage, and the spacing of the grooves and depth may be varied to provide any desired pressure or compression spring action, which is utilized to take up wear and maintain the required contact pressure between the surfaces to be sealed.

The thickness of the walls between the grooves may also be pre-determined to meet the required stiffness, as well as flexibility. The fact that the depth of the annular grooves and spacing and wall thickness can be controlled, is an important feature of the present invention, as this makes it possible to produce a sealing member having any degree of flexibility desired, and also making it possible to apply any pressure required to the surfaces to be sealed.

A sealing member when applied to bearing structures, such as shown in Figs. 1 and 3, is preferably held against rotation. This is accomplished by forming a pair of lugs 14 at the outer end of the sealing member, which enter recesses formed in the outer flange 10 of the cap. In other instances, it may be desirable to permit the sealing member to rotate for instance, as in the structure shown in Fig. 4, where the sealing member also functions as a thrust bearing. In this instance, the sealing member is secured to the shaft by a set screw 15 or any other suitable means. One end of the sealing member engages the bearing bushing 1, and accordingly functions as a thrust bearing, while the opposite end engages the inner face of a flange 16, secured by bolts 17, to the end of the bearing housing, and by contact forms a seal in conjunction therewith.

The contact pressure of the sealing member with relation to the surface to be sealed may be automatically increased when the sealing member is subjected to pressure. For instance, if the bearing structure forms a part of a pump or like machine, pressure will build up around the exterior of the sealing member, and enter the outer annular grooves, thereby imposing pressure which causes elongation of the sealing member and forces the ends thereof tightly against the co-acting sealing surfaces, thereby forming a liquid or gas tight seal. The areas in these grooves, the proportions of the sealing member and other dimensions are carefully calculated to enable the sealing member to contact the sealing surfaces with initial loading, and low friction, thereby insuring high efficiency of the seal, both for vacuum and pressure operating conditions.

Due to the fact that the sealing member is made from a single piece with sealing faces at opposite ends, and with a flexible body between them, it can be seen that a limited degree of self-alinement is provided so that the sealing faces at the opposite ends will tend to maintain uniform contact with the co-acting sealing surfaces. In Fig. 3, the rotating shaft is provided with a spherical surface 19, with which the sealing member engages. Such a surface will be fully self-alining and furthermore, prevents undue distortion of the flexible sealing member to compensate for any misalinement.

The sealing member, when applied to rotating shafts requires some means of taking up end thrust as endwise movement of the shaft away from the sealing member would defeat its purpose. Structures preventing endwise movement of the shaft away from the sealing member are shown in Figs. 3 and 4.

In Figs. 5 to 7, a radially flexible type of sealing member is shown, which permits installation in glands requiring a radial seal or packing. Such glands do not develop end thrust and therefore, requires no provision for counteracting the same. The radial type of sealing member is again shown as made from a single part, the only difference being that the annular grooves, 11A and 12A, while staggered, are horizontally disposed rather than vertically, as shown in Figs. 1 and 3. This construction allows the sealing member to expand and contract radially to a limited degree, because of the weakened wall sections formed by the annular staggered grooves, and furthermore, permits the center portion of the sealing member to center itself automatically, so that the sealing bore will remain concentric with the shaft during operation, and substantially no leakage will occur. The radial type of sealing member is preferably secured against rotation and while this may be accomplished in various ways, a locking plate 30, see Figs. 5 and 6, is illustrated. This plate has a lug 31 formed on it which extends into a groove 32 formed in the outer surface of the sealing member, thus securing the same against rotation.

Materials selected for this type of sealing member should be those in which a limited degree of softness or rubber characteristics are present. These qualifications are found available in certain classes of alloys in the non-ferros group, in the rubber group, in the plastic group, and in such materials as Micarta.

When manufacturing the radial type of sealing member, the inner bore is made preferably of the same diameter or .001 inch smaller than the shaft size at the smallest end of a taper, which may be provided at a predetermined angle. When the sealing member is forced over the shaft, the small end stretches and tightly hugs the sealing surface of the shaft, but with a minimum of friction. The outside of the sealing member expands and tightly seals itself against the housing bore. To insure shaft contact particularly as wear takes place, an annular spring 33 may be placed in the innermost groove as shown in Fig. 7.

Fig. 8 shows the sealing member having lugs 14 at one end to retain it against rotation, these lugs being of the same type as shown in Figs. 1 and 2, and a sealing surface 25 at the opposite end. This surface is the surface which contacts the rotating member whether it be a shaft, a pump runner or otherwise. This sealing area may be increased and decreased to suit varying conditions. The area 26 at the opposite end may also be of any size suitable, but as it engages a stationary surface, the actual area presented, although calculated for pressure balance, is not of such great importance.

In Fig. 9, a sealing member of ring-like construction is disclosed. It is interposed between the rotor 27 of a pump and the head generally indicated at 28. It is provided with annular grooves, both exteriorly and interiorly thereof as shown in the structure of Fig. 8 and as such provides sufficient resiliency to take up wear and maintain constant contact with the end surface of the rotor, and thereby prevents leakage between the end face of the rotor and the head 27.

One of the many advantages of the present type of sealing member is the many and varied materials that may be employed. For instance, it may be made of cast iron, such as used in piston rings, special iron alloys using nickel, or glass, such as "Pyrex" and metals having a high degree of spring action. In addition thereto, plastics of several types may be employed. Synthetic and natural rubber vulcanized to different degrees of hardness, compressed fiber products, etc.

While certain features of the present invention have been more or less specifically described and illustrated, I wish it understood that the design, materials and finish of the several parts employed, may be such as the experience and judgment of the designer or manufacturer may dictate, and I similarly wish it understood that other changes may be resorted to within the scope of the appended claims.

Having thus described and illustrated my invention, what I claim and wish to secure by letters patent, is:

1. A sealing device comprising a single piece elongated heavy walled annular member provided at each end with a sealing surface and presenting an inner and an outer surface, said annular member having a plurality of annular equally spaced parallel grooves cut in the exterior surface, and a plurality of similar parallel grooves cut in the interior surface and staggered with relation to the grooves in the outer surface, all of said grooves being normal to the axis of said member and forming between them parallel semiflexible disk-like members, the thickness of the disk-like members and the size of the grooves controlling the stiffness, flexibility, and the pressure exerted by the sealing device against the surfaces to be sealed.

2. A sealing device comprising a single piece elongated heavy walled annular member provided at each end with a sealing surface and presenting an inner and an outer surface, said annular member having a plurality of annular equally spaced parallel grooves cut in the exterior surface, and a plurality of similar parallel grooves cut in the interior surface and staggered with relation to the grooves in the outer surface, all of said grooves being normal to the axis of said member and forming between them parallel semi-flexible disk-like members, the thickness of the disk-like members and the size of the grooves controlling the stiffness, flexibility, and the pressure exerted by the sealing device against the surfaces to be sealed, said annular member being provided at the outer end with projecting lugs arranged to engage recesses in a fixed portion of a bearing housing for holding said member against rotation.

3. A sealing device comprising a single piece elongated heavy walled annular member provided at each end with a sealing surface and presenting an inner and an outer surface, said annular member having a plurality of annular equally spaced parallel grooves cut in the exterior surface, and a plurality of similar parallel grooves cut in the interior surface and staggered with relation to the grooves in the outer surface, all of said grooves being normal to the axis of said member and forming between them parallel semi-flexible disk-like members, the thickness of the disk-like members and the size of the grooves controlling the stiffness, flexibility, and the pressure exerted by the sealing device against the surfaces to be sealed, said annular member being provided at its inner end with fastening means for securing it to a rotary shaft, whereby the sealing device is adapted to function as a thrust bearing.

ALDEN G. RAYBURN.